Aug. 19, 1952  J. PASANEN  2,607,547
ANTIBACKLASH REEL
Filed Sept. 13, 1949  2 SHEETS—SHEET 2
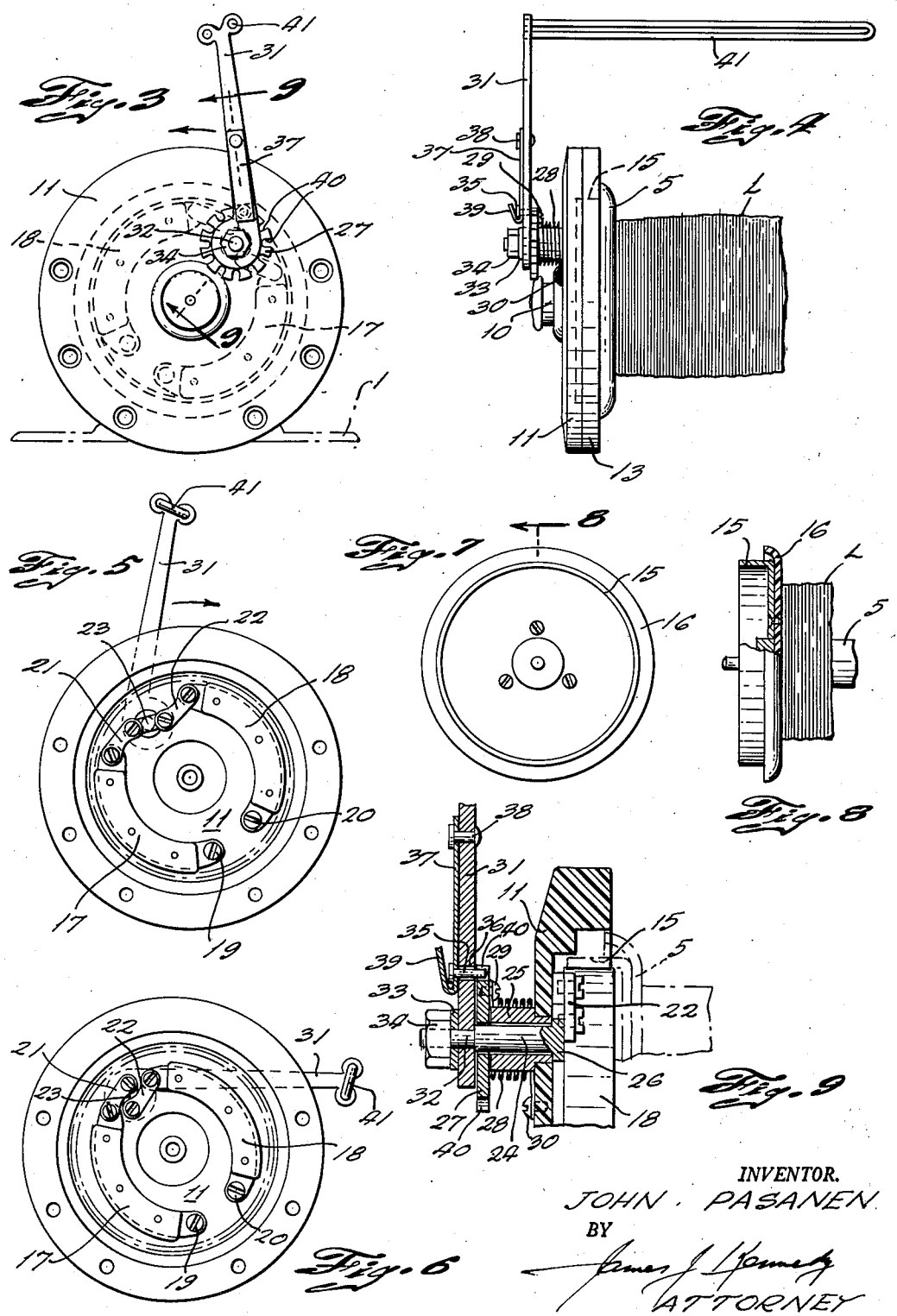
INVENTOR.
JOHN PASANEN
BY
James J. Kennedy
ATTORNEY Patented Aug. 19, 1952

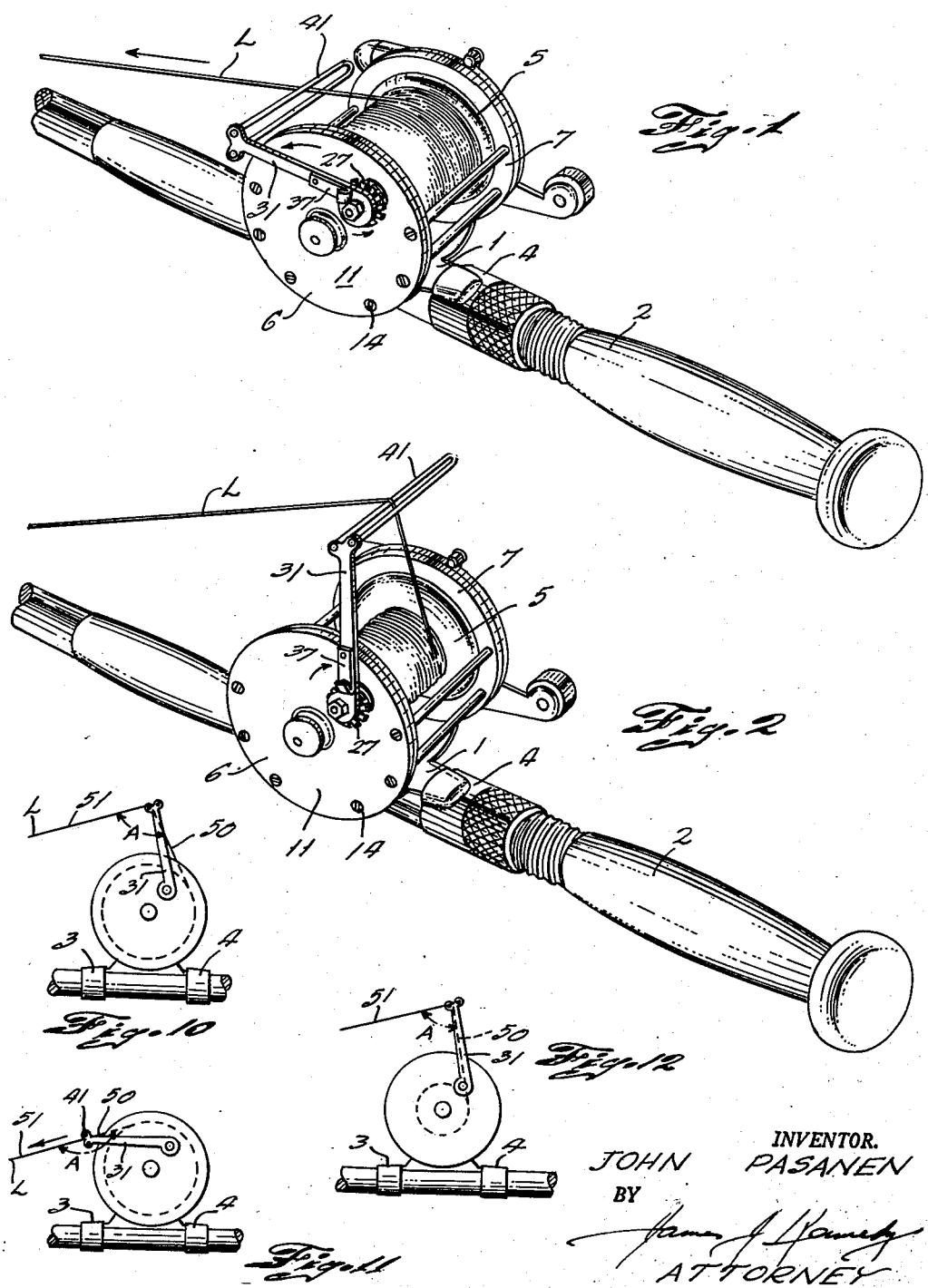

2,607,547

UNITED STATES PATENT OFFICE 2,607,547

ANTIBACKLASH REEL

John Pasanen, Merrick, N. Y.

Application September 13, 1949, Serial No. 115,451

2 Claims. (Cl. 242—84.5)

This invention relates to anti-backlash fishing reels.

The general object of the invention is to provide an improved braking mechanism and control therefor which automatically prevent backlash while interfering to the minimum extent possible with the cast.

With this general object and still other objects which will appear in the following full description in mind, the invention consists in the combination and arrangements of parts and details of construction which will now first be fully described in connection with the accompanying drawing and then be more particularly pointed out in the appended claims.

In the drawing:

Figure 1 is a perspective view of a reel embodying the invention in a preferred form of embodiment and showing the same in position on the body of a casting rod;

Figure 2 is a view similar to Figure 1 but showing a different position of the parts;

Figure 3 is a view of the reel of Figure 1 in side elevation, showing certain internal structure in dotted lines;

Figure 4 is a rear elevation of one end of the reel;

Figure 5 is a back view of the end plate of Figure 3, showing internal brake structure;

Figure 6 is a view similar to Figure 5 showing the parts in a different position;

Figure 7 is a detail view of the brake drum element which appears in phantom in Figures 5 and 6;

Figure 8 is a rear elevation view of one end of the reel spool showing the brake drum mounting and is partly in section on the line 8 of Figure 7;

Figure 9 is an enlarged section on the line 9—9 of Figure 3; and

Figures 10, 11 and 12 are schematic side elevations of the reel showing the same in different operating positions.

The reel, apart from the features specifically described herein, may be of any desired construction and may incorporate any other of the usual features and attachments as required for particular classes of service.

The reel is provided with means, such as the usual feet 1, for attaching it to a fishing rod 2, by means of rod fixtures including the clips 3 and 4, one of which is slidably mounted for attaching and removing the reel in the usual way. The reel comprises a rotatable reel spool member 5 journaled at each end in end housings 6 and 7, a handle and gearing or other drive connections within the housing being provided for winding the reel. These elements within housing 7 being conventional, they are not shown in the drawing. The reel shaft extends into the housing 6, being journaled in a bearing cup 10 (Figure 4), attached to the outer face plate 11 of the housing, which element is removably attached to the inner end frame structure 13 of the reel as by means of screws 14 (Figures 1 and 2).

A brake drum 15 is fixed to the end 16 of the reel spool, and a pair of brake shoes 17 and 18 cooperate therewith for applying torque to the reel. These brake shoes are pivotally mounted at 19 and 20 on the outer cover or face plate 11 and are actuated by a toggle mechanism comprising a pair of links 21 and 22, pivotally connected to the brake shoes 17 and 18 and to the ends of a rotatable bar 23, the center of which is attached to a stub shaft 24, which is journaled in the face plate 11, as best shown in Figure 9. A bearing sleeve or bushing 25 for shaft 24 is fixed to the face plate 11, as indicated, and the inner end of the shaft 24 is enlarged as at 26 to prevent its slipping out through the bearing. A rotatable tension adjusting disc 27 is carried by the shaft 24 and a coil or torsion spring 28 is attached at one end, 29, to this disc and at the other end, 30, to the face plate 11.

A pilot arm or tension control lever 31 is mounted on the reduced end 32 of shaft 24 and is held thereon by means of a washer 33 and nut 34. The arm 31 is fixed to the shaft 32 for turning the same as by means of a flat on the reduced end of the shaft and is coupled to the disc 27 by means of a pin 35, slidable back and forth through an aperture 36 in the arm 31 and normally held in the position of Figure 9 by means of a strap spring 37 attached to the arm 31 by a rivet 38. The end of the spring is doubled over to hold the head of pin 35, as indicated at 39. Pin 35 may enter any of a number of notches 40 in the disc 27 for coupling the arm 31 thereto in various angular relationships. While the number of notches 40 may vary, 12 notches or thereabouts, as indicated in the drawing, will ordinarily be found satisfactory.

The pilot arm 31 carries on its outer end an elongated wire loop or stirrup 41, which extends across the rotatable spool of the reel and through which the fishing line L may pass, as indicated in the figures. When the arm 31 is in its upper position, as indicated in Figure 5, braking forces will be applied to the brake drum 15 by means of the brake shoes 17 and 18, and when it is in its lower position, as indicated in Figure 6, no braking forces will be applied. The braking force applied is regulated by disengaging pin 35 from disc 27, using the thumb nail under the end 39 for this purpose, turning the disc 27 to the desired amount and then releasing the pin 35 so as to permit it to enter one of the notches 40. The effect of this adjustment will be described in detail below, in connection with the following description of the operation of the device.

As is well known, the general object of an anti-backlash reel is to prevent the spool from overrunning the line to any substantial extent, and secondly, to interfere to the least extent possible with the free movement of the line during the casting. This requires what is, in effect, an automatic tension control. The existence of any tension in the line L indicates that the reel spool is not overrunning or delivering the line faster than it is being pulled off the rod. It is desirable that the braking force should not be applied to the reel until such time as this tension has substantially disappeared. In practice, it is necessary to brake the reel more or less continuously toward the end of the cast so as to slow down the reel as the movement of the line following the plug or bait being cast slows down. For this purpose, the line tension is measured by measuring the deflection of the line.

In previous anti-backlash automatic brakes for reels the tension measuring member corresponding to stirrup 41 has ordinarily had a very small movement between braking and non-braking position and moreover the movement thereof in applying the braking force has usually been downward or toward the rod. In the present construction, an arc of movement of nearly 90° for the brake control arm 31 may be provided and the stirrup 41 is carried out beyond the limits of the reel so that the moment arm is also very large. The pilot arm preferably moves upward or away from the rod, as shown, and is preferably pivoted about a point located rearwardly of the reel spool axis. The parts are also so related as to utilize the angles of the line as it enters and leaves the stirrup 41 in obtaining the most desirable relationships between the line tensions and spring tensions in the various positions. These relations are exhibited in the diagrammatic Figures 10-12 and in Figures 5 and 6, showing the position of the brakes.

As is apparent, the line passes upward from the reel spool in a course 50 through the stirrup 41 and off the same in a course 51, passing to the first guide on the rod, which will normally be located at a considerable distance. In a surf casting rod, this distance may be about 5 ft. The angles of the line courses 50 and 51 will depend upon several factors, among which the most important are the position of the arm 31 and the effective diameter of the reel spool. Figures 10 and 11 illustrate the action with a full spool and correspondingly large effective reel spool diameter. With tension on the line, holding down the arm 31 as indicated in Figure 11, the angle between the line courses 50 and 51 approaching and leaving the stirrup may be very large. In consequence, the resultant of these tensions may also be relatively small. However, as the tension decreases and the arm 31 is permitted to rise toward the position of Figure 10, the angle A between the entering and leaving courses 50 and 51 decreases, closing down toward about 90° and the absolute value of this angle depending upon the amount of line left on the reel, as indicated in Figures 10 to 12. Under these conditions, the resultant force due to the tension is very much increased, thus contributing to the sensitivity of the tension control. As the arm 31 moves upwardly from the position of Figure 11 to that of Figure 10, no braking force is applied to the reel during the major part of this movement and the braking force begins to be applied as soon as the brake shoes 17 and 18 contact the brake drum 15 (position of Figure 5). In this position, the torque applied to the shaft 24 by the arm 31 will be proportional to the difference between the torque of spring 28 in this position and the torque due to the tension of the line. As will be apparent, if there is no tension in the line, full braking force of the spring as determined by the setting of disc 27 will be applied through the brake shoes 17 and 18. As soon, however, as the reel is checked sufficiently to build up some tension in the line, the pressure of the brake shoes against the drum and the braking force will be correspondingly reduced. In this way, toward the latter part of the cast, braking force as required is applied so as to maintain a certain minimum tension in the line. The best value for this is readily determined by a few trial casts, and will of course vary with the length of cast and with the weight of the plug, wind conditions and other factors.

The arrangement of the links 21, 22 and the arm 23, as is evident from Figure 5, forms a toggle so that the amount of movement of the arm 31 required to vary the braking pressure from zero to maximum is very small and is practically negligible. Further, it will be apparent that the torque on the brake shoes due to the brake drum 15 and which is a direct measure of the braking force applied, will be exerted in such a direction as to tend to rotate the shoe 18 toward the brake drum 15 and the shoe 17 away from it. Since these elements are linked together by members 21, 22 and 23, the effect of the torque of the reel spool against the braking mechanism is cancelled out. This characteristic of the braking mechanism forms an important feature of the present device since the braking pressure applied at high speeds of reel rotation will be as great as that applied at low speeds of reel rotation, so that the braking force, for given tension in line and given setting of the spring, will be proportional to the speed of the reel. In a device in which the torque of the reel against the brake is permitted to react against the tension measuring system, this result cannot be obtained, so that in such devices there is a tendency for excessive backlash with long casts and excessive braking action with short casts. Moreover, without this feature of the present invention, as will be apparent from the foregoing disclosure, it is impossible to regulate the braking action properly from the time when the reel is running at full speed down to the end of the cast.

As previously noted, with any given adjustment of the spring 28 there will be a definite braking position for the arm 31, as indicated in Figures 10 and 12. When moving toward this position from the position of Figure 11, it will be noted, as previously pointed out, that while the tension in the line is decreasing, the ratio between the resultant force on the arm 31 due to this tension, and the tension itself, increases. The actual moment due to the tension is proportional to this resultant and to the effective moment arm. Inasmuch as the resultant force is directed along the bisector of the angle A, it will be observed that the moment arm varies. The parts are preferably so laid out, that in the braking position the moment due to a given tension in the line will be a maximum. This result is achieved in the construction shown and may also be achieved with modification in the dimensions of the parts and location of the tension arm pivot point by selecting the angular position of the arm in which the brakes are applied.

What is claimed is:

1. In an anti-backlash fishing reel having a rotatable reel spool and end housing supporting the same, and in combination, cooperating brake elements on the reel spool and on an end housing of the reel, a brake control shaft journaled in the end housing, a tension control arm for rotating the shaft to engage and disengage the cooperating brake elements, a coil spring surrounding the shaft for exerting torque on the same, and adjustable means for coupling the spring and tension arm together to vary the torque exerted on the shaft by the spring.

2. An anti-backlash reel according to claim 1, in which the control arm is arranged to deflect a line through substantially a right angle in braking position and to pass the line with substantially no deflection in a lower position.

JOHN PASANEN.

REFERENCES CITED

The following references are of record in the file of this patent:

UNITED STATES PATENTS

| Number | Name | Date |
|---|---|---|
| 1,539,646 | Catucci | May 26, 1925 |
| 1,609,684 | Bellon | Dec. 7, 1926 |
| 2,516,517 | Hutchison | July 25, 1950 |
| 2,555,604 | Pies | June 5, 1951 |

FOREIGN PATENTS

| Number | Country | Date |
|---|---|---|
| 44,666 | France | Dec. 26, 1934 |
| | (Addition to 773,025) | |
| 447,510 | Great Britain | May 20, 1936 |
| 622,525 | Great Britain | May 3, 1949 |
| 667,680 | France | June 24, 1929 |